US011902008B2

(12) United States Patent
Nakazawa

(10) Patent No.: US 11,902,008 B2
(45) Date of Patent: Feb. 13, 2024

(54) CONTROL DEVICE, PROGRAM, SYSTEM, AND CONTROL METHOD

(71) Applicant: HAPSMobile Inc., Tokyo (JP)

(72) Inventor: Eiji Nakazawa, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 18/349,959

(22) Filed: Jul. 11, 2023

(65) Prior Publication Data

US 2023/0353231 A1  Nov. 2, 2023

Related U.S. Application Data

(63) Continuation of application No. PCT/JP2021/048698, filed on Dec. 27, 2021.

(30) Foreign Application Priority Data

Jan. 18, 2021 (JP) ................................ 2021-006007

(51) Int. Cl.
*H04B 7/185* (2006.01)
*H04W 76/10* (2018.01)

(52) U.S. Cl.
CPC ........ *H04B 7/18504* (2013.01); *H04W 76/10* (2018.02)

(58) Field of Classification Search
CPC ........................... H04B 7/18504; H04B 7/155; H04B 7/15507; H04B 7/15514; H04B 7/15521;

(Continued)

(56) References Cited

U.S. PATENT DOCUMENTS 9,609,714 B2 *  3/2017  Hori ...................... H05B 45/24
10,212,610 B2 *  2/2019  Gayrard ................ H04W 16/26
(Continued)

FOREIGN PATENT DOCUMENTS

JP  2019047467 A  3/2019
JP  2019135823 A  8/2019
(Continued)

OTHER PUBLICATIONS

Mohammed, Abbas, et al. "The role of high-altitude platforms (HAPs) in the global wireless connectivity." Proceedings of the IEEE 99.11 (2011): 1939-1953. (Year: 2011).*

(Continued)

*Primary Examiner* — Sharad Rampuria

(57) ABSTRACT

Provided is a control device including: a flight vehicle position information acquisition unit which acquires service flight vehicle position information indicating positions of a plurality of service flight vehicles, each of which functions as a stratosphere platform and is mounted with a communication device which forms a wireless communication area by emitting a beam and provides a wireless communication service to a user terminal in the wireless communication area; an arrangement determination unit which determines arrangement of a relay flight vehicle which relays communication of one service flight vehicle among the plurality of service flight vehicles on a basis of a predetermined condition and the service flight vehicle position information; and a flight vehicle control unit which controls the relay flight vehicle to move according to the arrangement determined by the arrangement determination unit and establish wireless communication connection with the one service flight vehicle.

18 Claims, 9 Drawing Sheets

(58) Field of Classification Search
CPC ............ H04B 7/15528; H04B 7/15535; H04B 7/15542; H04B 7/1555; H04B 7/2606; H04B 7/17; H04B 7/165; H04B 7/15592; H04B 7/15585; H04B 7/15578; H04B 7/15571; H04B 7/15564; H04B 7/15557; H04W 76/10; H04W 88/04; H04W 16/26

See application file for complete search history.

(56) References Cited

U.S. PATENT DOCUMENTS

| | | | | |
|---|---|---|---|---|
| 10,651,922 | B2* | 5/2020 | Miyakawa | ......... H04B 7/18504 |
| 10,897,716 | B1* | 1/2021 | Ananth | ............ H04B 7/18504 |
| 2020/0380874 | A1 | 12/2020 | Fujii | |
| 2021/0036761 | A1 | 2/2021 | Murakami | |
| 2021/0050910 | A1 | 2/2021 | Matsuura | |
| 2022/0017221 | A1 | 1/2022 | Tsutsui | |

FOREIGN PATENT DOCUMENTS

| | | |
|---|---|---|
| JP | 2019140427 A | 8/2019 |
| JP | 2020167485 A | 10/2020 |
| WO | 2019216357 A1 | 11/2019 |

OTHER PUBLICATIONS (ISA/237) Written Opinion of the International Search Authority for International Patent Application No. PCT/JP2021/048698, mailed by the Japan Patent Office dated Apr. 5, 2022.

Sudheesh, p. G et al., Sum-Rate Analysis for High Altitude Platform (HAP) Drones With Tethered Balloon Relay [online], IEEE Communications Letters, vol. 22, No. 6, Jun. 2018, [searched on Mar. 17, 2022], 2017.12.21, pp. 1240-1243, URL:https://ieeexplore.IEEE.org/stamp/stamp.jsp?tp=&arnumber=8233141,I, Ii, Iii-A, V, Fig.1.

* cited by examiner

CONTROL DEVICE, PROGRAM, SYSTEM, AND CONTROL METHOD

The contents of the following patent application(s) are incorporated herein by reference:
NO. 2021-006007 filed in JP on Jan. 18, 2021
NO. PCT/JP2021/048698 filed in WO on Dec. 27, 2021

BACKGROUND

1. Technical Field

The present invention relates to a control device, a program, a system, and a control method.

2. Related Art

Patent Document 1 describes a communication system using a High Altitude Platform Station (HAPS).

CITATION LIST

Patent Document

Patent Document 1: Japanese Patent Application Publication No. 2019-135823

DESCRIPTION OF EXEMPLARY EMBODIMENTS

When a communication network is constructed between HAPSs which are providing Service Link (SL), the HAPSs stay at a fixed point in the air, and thus it is difficult to have a flexible, advanced, and changeable network (NW) configuration. For example, a system 10 according to the present embodiment may include an HAPS dedicated to inter-HAPS communication (hereinafter, may be referred to as "inter-HAPS") for solving the above-described problems, and an NW operation control device.

The inter-HAPS incorporates, for example, a function of freely moving a position in the air, a hub function, a router function, a 5G Mobile Edge Computing (MEC) function, and an interconnection interface (IF) function capable of relaying between heterogeneous HAPS. As a result, the system 10 according to the present embodiment can clear restrictions such as restriction of a fixed-point staying position of a service providing HAPS, restriction of an inter-HAPS communication distance, restriction due to weather conditions, and restriction of an installation place of a gateway (GW), and simultaneously realize (1) an NW configuration using the hub function incorporated in the inter-HAPS, (2) relay of a Feeder Link (FL) by the inter-HAPS, (3) a mesh/ring type NW configuration using the router function incorporated in each of a plurality of inter-HAPS, (4) a 5G low delay service using the 5G MEC function incorporated in the inter-HAPS, and (5) inter-heterogeneous HAPS communication using the interconnection IF function incorporated in the inter-HAPS.

Hereinafter, the invention will be described through embodiments of the invention, but the following embodiments do not limit the invention according to claims. In addition, not all of the combinations of features described in the embodiments are essential to the solution of the invention.

Figure 1:
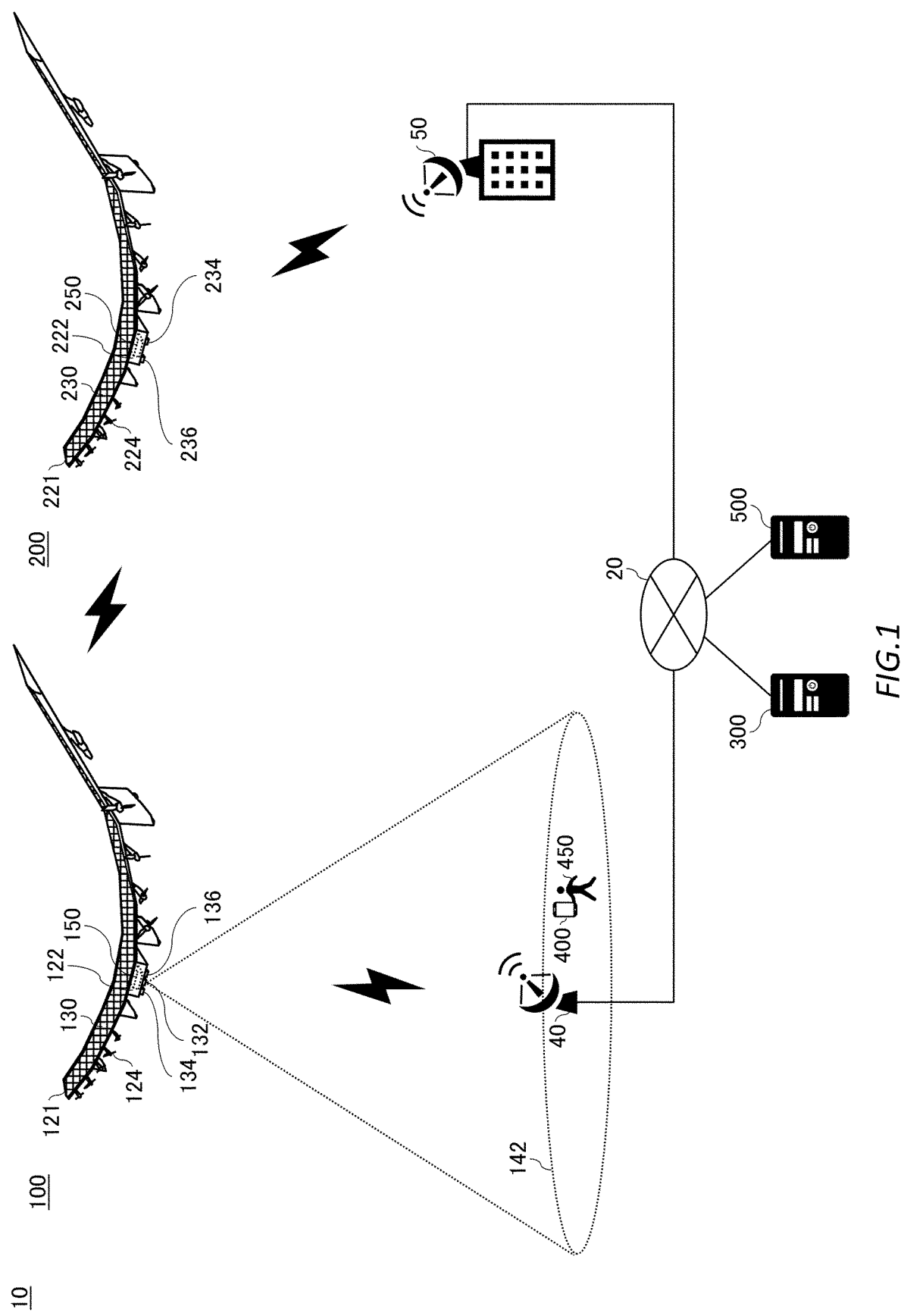
FIG. 1 schematically illustrates an example of a system 10.

FIG. 1 schematically illustrates an example of the system 10. The system 10 according to the present embodiment includes a relay flight vehicle 200 and a control device 300. Although FIG. 1 illustrates one relay flight vehicle 200, the system 10 may include two or more relay flight vehicles 200. The system 10 may include a service flight vehicle 100. Although FIG. 1 illustrates one service flight vehicle 100, the system 10 may include two or more service flight vehicles 100. The system 10 may include a gateway 40. The system 10 may include a gateway 50.

The service flight vehicle 100 includes a main wing 121, a main body 122, a propeller 124, a solar cell panel 130, an antenna 132, an antenna 134, and an antenna 136. The main body 122 includes a communication device 150, and a battery and a flight control device (not illustrated). The battery stores electric power generated by the solar cell panel 130. The flight control device controls the flight of the service flight vehicle 100. For example, the flight control device causes the service flight vehicle 100 to fly by using the electric power stored in the battery to rotate the propeller 124.

The communication device 150 forms a wireless communication area 142 by emitting a beam using the antenna 132, and provides a wireless communication service to a user terminal 400 owned by a user 450 in the wireless communication area 142. The communication device 150 may establish wireless communication connection with the user terminal 400 in the wireless communication area 142 by using the antenna 132. The communication device 150 and the flight control device may be integrated.

The communication device 150 may establish wireless communication connection with the gateway 40 on the ground by using the antenna 134. For example, the communication device 150 communicates with the control device 300 via the gateway 40 and a network 20.

The network 20 may include a core network provided by a communication operator. The core network is compliant with a 5G (5th Generation) communication system, for example. The core network may be compliant with a mobile communication system of a 6G (6th Generation) communication system onwards. The core network may be compliant with a 3G (3rd Generation) communication system. The core network may be compliant with an LTE (Long Term Evolution) communication system. The network 20 may include the Internet.

The antenna 134 has, for example, a function of transmitting and receiving a right-handed polarized radio wave. The antenna 134 has, for example, a function of transmitting and receiving a left-handed polarized radio wave. The antenna 134 may have a function of transmitting and receiving both the right-handed polarized radio wave and the left-handed polarized radio wave.

The communication device 150 may establish wireless communication connection with the relay flight vehicle 200 by using the antenna 136. For example, the communication device 150 communicates with the control device 300 via the relay flight vehicle 200.

The communication device 150 may establish wireless communication connection with another service flight vehicle 100 by using the antenna 136. For example, the communication device 150 communicates with the control device 300 via another service flight vehicle 100.

The service flight vehicle 100 may include a plurality of antennas 136. The service flight vehicle 100 includes, for example, two antennas 136. The service flight vehicle 100 may include more than two antennas 136.

The antenna 136 has, for example, a function of transmitting and receiving a right-handed polarized radio wave. The antenna 136 has, for example, a function of transmitting and receiving a left-handed polarized radio wave. The antenna 136 may have a function of transmitting and receiving both the right-handed polarized radio wave and the left-handed polarized radio wave.

For example, the service flight vehicle 100 flies in the stratosphere to provide a wireless communication service to the user terminal 400. The service flight vehicle 100 may function as a stratosphere platform.

For example, the service flight vehicle 100 covers an area of a covering target with the wireless communication area 142 while circulating in the sky above the area. In addition, for example, the service flight vehicle 100 covers the entire region by moving in the sky above the area of the covering target while covering a part of the area with the wireless communication area 142.

The service flight vehicle 100 has, for example, a function of acquiring position information of the service flight vehicle 100. The service flight vehicle 100 acquires the position information of the service flight vehicle 100 by using, for example, a Global Navigation Satellite System (GNSS) function. The service flight vehicle 100 transmits the acquired position information of the service flight vehicle 100 to the control device 300 via the communication device 150.

The service flight vehicle 100 has, for example, a function of acquiring communication speed information of the communication device 150. The service flight vehicle 100 transmits the acquired communication speed information to the control device 300 via the communication device 150.

The relay flight vehicle 200 includes a main wing 221, a main body 222, a propeller 224, a solar cell panel 230, an antenna 234, and an antenna 236. The main body 222 includes a relay device 250, and a battery and a flight control device (not illustrated). The battery stores electric power generated by the solar cell panel 230. The flight control device controls the flight of the relay flight vehicle 200. For example, the flight control device causes the relay flight vehicle 200 to fly by using the electric power stored in the battery to rotate the propeller 224.

The relay device 250 may establish wireless communication connection with the gateway 50 on the ground by using the antenna 234. For example, the relay device 250 communicates with the control device 300 via the gateway 50 and the network 20. The relay device 250 and the flight control device may be integrated.

The gateway 50 is, for example, a gateway dedicated to the relay flight vehicle 200. The gateway 50 may be a gateway that can be used by the service flight vehicle 100 and the relay flight vehicle 200.

The gateway 50 may be installed at a point where infrastructure such as a power supply and an optical line is already prepared. For example, the gateway 50 is installed on the roof of a building or a data center owned by a Mobile Network Operator (MNO).

The antenna 234 has, for example, a function of transmitting and receiving a right-handed polarized radio wave. The antenna 234 has, for example, a function of transmitting and receiving a left-handed polarized radio wave. The antenna 234 may have a function of transmitting and receiving both the right-handed polarized radio wave and the left-handed polarized radio wave.

The relay device 250 may establish wireless communication connection with the service flight vehicle 100 by using the antenna 236. For example, the relay device 250 relays communication of the service flight vehicle 100. The relay device 250 relays, for example, communication between the service flight vehicle 100 and the gateway 50 on the ground. The relay device 250 may relay communication between the service flight vehicle 100 and another service flight vehicle 100.

The relay device 250 may establish wireless communication connection with another relay flight vehicle 200 by using the antenna 236. For example, the relay device 250 relays communication of another relay flight vehicle 200. The relay device 250 relays, for example, communication between another relay flight vehicle 200 and the gateway 50 on the ground. The relay device 250 may relay communication between the service flight vehicle 100 and another relay flight vehicle 200.

The relay flight vehicle 200 may include a plurality of antennas 236. The relay flight vehicle 200 includes, for example, two antennas 236. The relay flight vehicle 200 may include more than two antennas 236.

The antenna 236 has, for example, a function of transmitting and receiving a right-handed polarized radio wave. The antenna 236 has, for example, a function of transmitting and receiving a left-handed polarized radio wave. The antenna 236 may have a function of transmitting and receiving both the right-handed polarized radio wave and the left-handed polarized radio wave.

The relay flight vehicle 200 may fly in the stratosphere to relay the communication of the service flight vehicle 100 or another relay flight vehicle 200. For example, the relay flight vehicle 200 flies at the same altitude as the altitude at which the service flight vehicle 100 or another relay flight vehicle 200 flies.

The relay flight vehicle 200 may fly at an altitude different from the altitude at which the service flight vehicle 100 or another relay flight vehicle 200 flies. For example, the relay flight vehicle 200 flies at an altitude higher than the altitude at which the service flight vehicle 100 or another relay flight vehicle 200 flies. The relay flight vehicle 200 may fly at an altitude lower than the altitude at which the service flight vehicle 100 or another relay flight vehicle 200 flies.

For example, in order to relay the communication of the service flight vehicle 100, the relay flight vehicle 200 is on standby in midair while flying. The relay flight vehicle 200 may be on standby on the ground in a stopped state in order to relay the communication of the service flight vehicle 100.

The relay flight vehicle 200 has, for example, a function of acquiring position information of the relay flight vehicle 200. For example, the relay flight vehicle 200 acquires the position information of the relay flight vehicle 200 by using the GNSS function. The relay flight vehicle 200 transmits the acquired position information of the relay flight vehicle 200 to the control device 300 via the relay device 250.

The relay flight vehicle 200 may not have a function of providing a wireless communication service to the user terminal 400. Since the relay flight vehicle 200 which does not has a function of providing a wireless communication service is not mounted with a configuration necessary for providing a wireless communication service, an aircraft weight can be reduced as compared with the relay flight vehicle 200 which has a function of providing a wireless communication service. Therefore, the relay flight vehicle 200 which does not have a function of providing a wireless communication service can be mounted with the antenna 234 and the antenna 236 which are larger in size and higher in performance than the relay flight vehicle 200 which has a function of providing a wireless communication service. As a result, the relay flight vehicle 200 which does not have a function of providing a wireless communication service can establish wireless communication connection with the gateway 50, the service flight vehicle 100, or the like positioned at a point farther from the relay flight vehicle 200. Note that the relay flight vehicle 200 may have a function of providing a wireless communication service to the user terminal 400.

The user terminal 400 may be any terminal as long as it is a communication terminal capable of communicating with the control device 300 via the communication device 150. For example, the user terminal 400 is a mobile phone such as a smartphone, a tablet terminal, a wearable terminal, or the like.

The control device 300 controls the relay flight vehicle 200. For example, the control device 300 determines the arrangement of the relay flight vehicle 200 which relays the communication of the service flight vehicle 100, and controls the relay flight vehicle 200 to move according to the determined arrangement and establish wireless communication connection with the service flight vehicle 100.

For example, the control device 300 determines the arrangement of the relay flight vehicle 200 such that wireless communication connection can be established with both the service flight vehicle 100 and the gateway 50. The control device 300 may determine the arrangement of the relay flight vehicle 200 such that wireless communication connection can be established with both the service flight vehicle 100 and another service flight vehicle 100.

The control device 300 is installed on the ground, for example. The control device 300 is installed on, for example, the network 20. The control device 300 may be mounted on the service flight vehicle 100. The control device 300 may be mounted on the relay flight vehicle 200.

A weather-related information management server 500 manages weather-related information on the weather in the wireless communication area 142 formed by each of a plurality of service flight vehicles 100. The weather-related information management server 500 transmits the weather-related information to the control device 300 via the network 20.

In a conventional system, a communication network between a flight vehicle providing a wireless communication service and a gateway on the ground is configured by establishing wireless communication connection between the flight vehicle and the gateway on the ground or another flight vehicle providing a wireless communication service. However, since the flight vehicle providing the wireless communication service needs to fly in the sky above an area near the center of the wireless communication area to be formed, the flight vehicle cannot freely move. In addition, a wireless communication-connectable distance between flight vehicles providing wireless communication services is about 200 km at the maximum, and a wireless communication-connectable distance between a flight vehicle providing a wireless communication service and a gateway on the ground is about 100 km at the maximum. For this reason, a flight vehicle providing a wireless communication service can establish wireless communication connection only with the gateway on the ground positioned in a range of the wireless communication-connectable distance from the flight vehicle or another flight vehicle providing a wireless communication service in a range of the wireless communication-connectable distance from the flight vehicle. In particular, when the wireless communication area formed by a flight vehicle providing a wireless communication service is an area, such as an area with poor weather conditions, in which the gateway cannot be installed, there is no gateway that can perform wireless communication connection with the flight vehicle. For this reason, the conventional system cannot flexibly construct a communication network between a flight vehicle providing a wireless communication service and a gateway on the ground.

On the other hand, according to the system 10 according to the present embodiment, a communication network between the service flight vehicle 100 and the gateway on the ground is configured by further using the relay flight vehicle 200 that can freely move. The relay flight vehicle 200 relays the communication of the service flight vehicle 100, so that the service flight vehicle 100 can wirelessly communicate via the relay flight vehicle 200 with another service flight vehicle 100 or the gateway 50 on the ground which is more than the wireless communication-connectable distance away from the service flight vehicle 100. As a result, the system 10 according to the present embodiment can flexibly construct a communication network between the service flight vehicle 100 and the gateway on the ground as compared with the conventional system.

Figure 2:
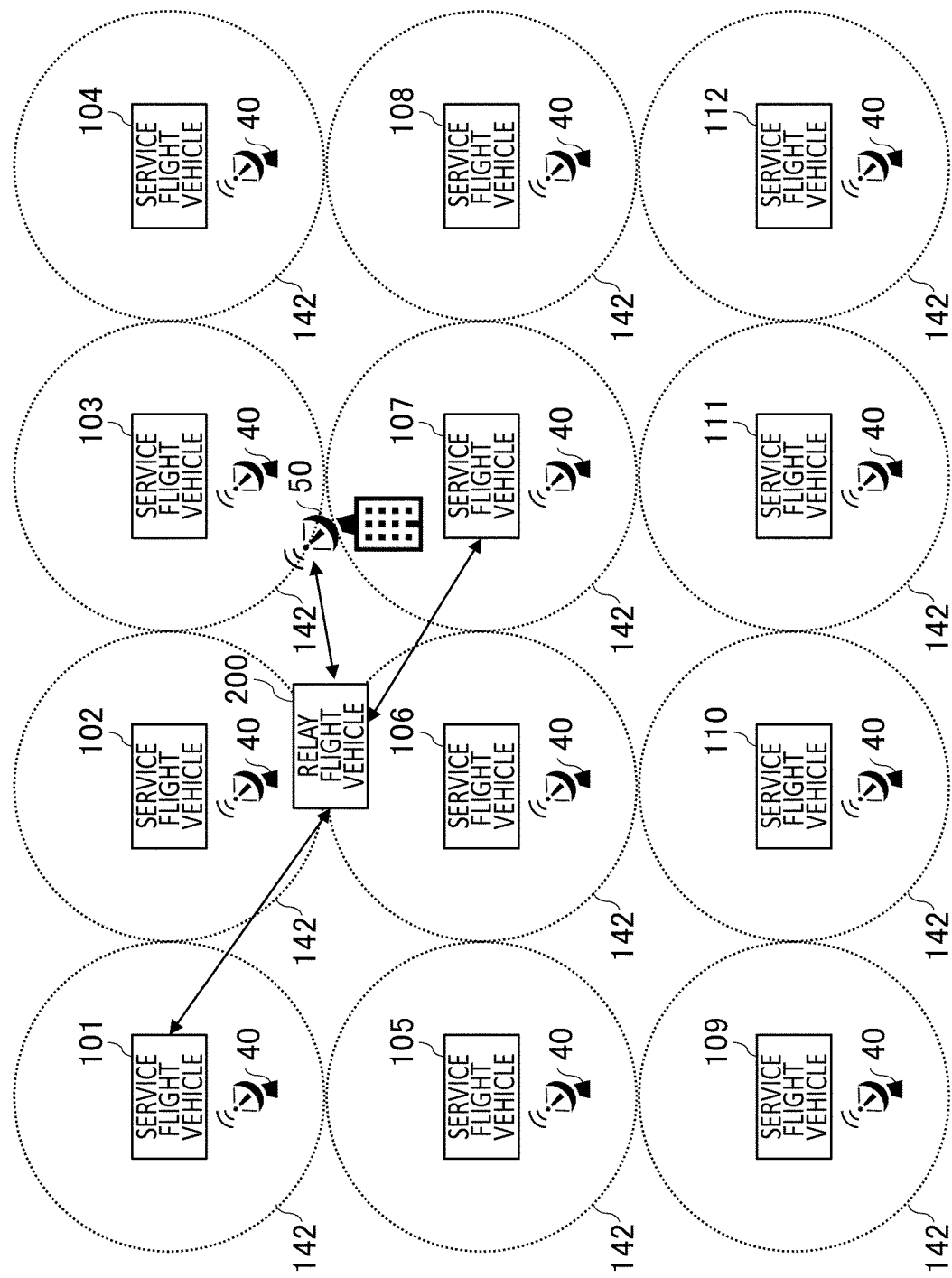
FIG. 2 is an explanatory diagram for explaining an example of arrangement of a relay flight vehicle 200.

FIG. 2 is an explanatory diagram for explaining an example of the arrangement of the relay flight vehicle 200. The relay flight vehicle 200 is arranged such that, for example, a communication network from the gateway 50 on the ground to the plurality of service flight vehicles 100 configures a tree-type communication network. In FIG. 2, the description will be given about the arrangement of the relay flight vehicle 200 when each of the service flight vehicles 101 to 112 forms the wireless communication area 142.

The relay flight vehicle 200 is arranged such that wireless communication connection can be established with the gateway 50, the service flight vehicle 101, and the service flight vehicle 107. In this case, the relay flight vehicle 200 functions as a hub for the service flight vehicle 101 and the service flight vehicle 107 to wirelessly communicate with the gateway 50.

The relay flight vehicle 200 relays, for example, communication between the service flight vehicle 101 and the gateway 50. The relay flight vehicle 200 relays, for example, communication between the service flight vehicle 107 and the gateway 50. The relay flight vehicle 200 may relay communication between the service flight vehicle 101 and the service flight vehicle 107.

For example, the relay flight vehicle 200 receives a signal from the gateway 50, and transmits the signal to the service flight vehicle 101 or the service flight vehicle 107 on the basis of the identifier information of the service flight vehicle included in the signal. In this case, the relay flight vehicle 200 functions as a router for the service flight vehicle 101 and the service flight vehicle 107.

Figure 3:
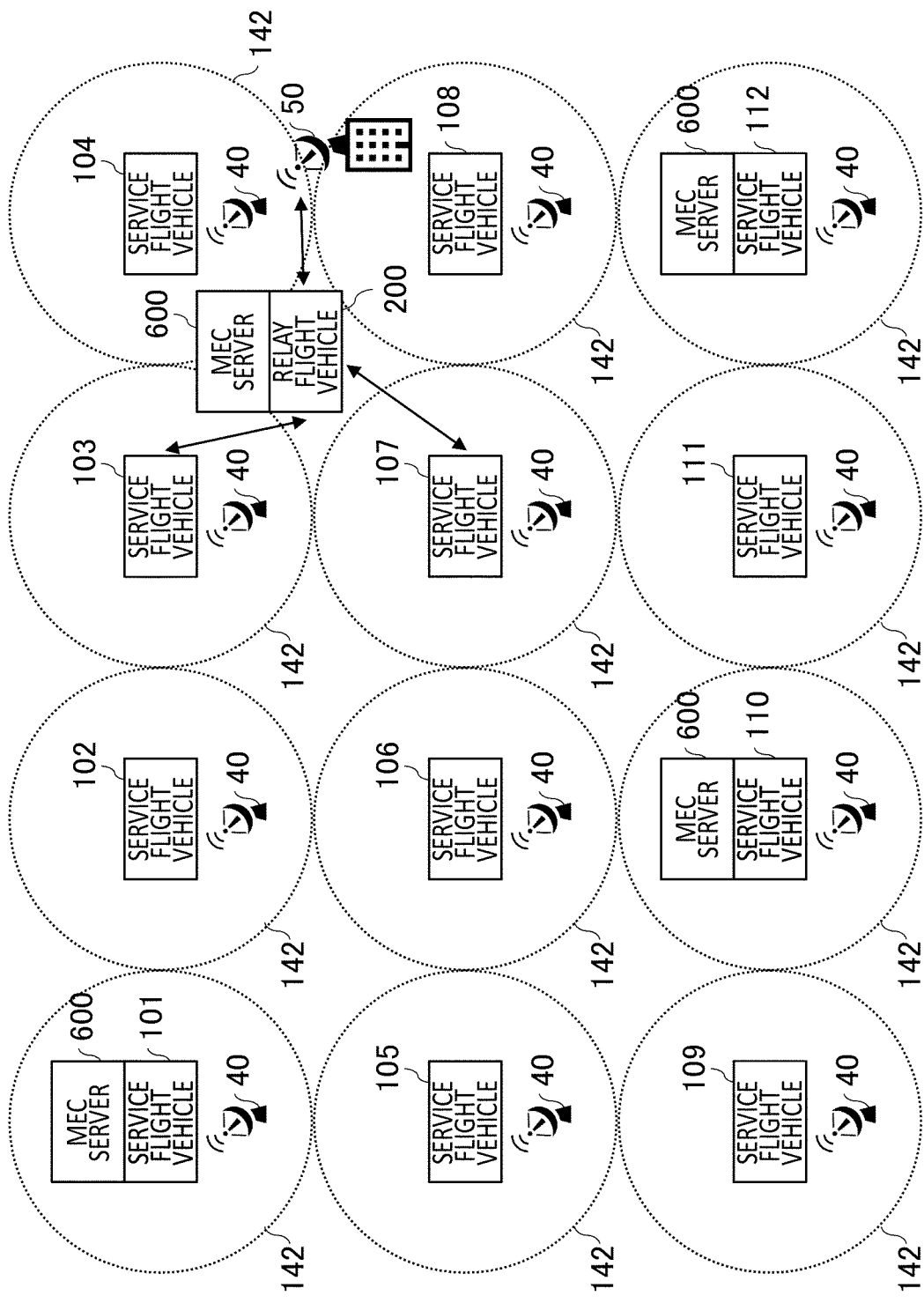
FIG. 3 is an explanatory diagram for explaining another example of the arrangement of the relay flight vehicle 200.

FIG. 3 is an explanatory diagram for explaining another example of the arrangement of the relay flight vehicle 200. Here, the description will be given about the arrangement of the relay flight vehicle 200 when each of the service flight vehicles 101 to 112 forms the wireless communication area 142.

In the example illustrated in FIG. 3, the relay flight vehicle 200 functions as the MEC. The relay flight vehicle 200 is mounted with an MEC server 600. In addition, similarly to the relay flight vehicle 200, the service flight vehicle 101, the service flight vehicle 110, and the service flight vehicle 112 function as the MEC. The service flight vehicle 101, the service flight vehicle 110, and the service flight vehicle 112 are mounted with the MEC servers 600. The service flight vehicle 101, the service flight vehicle 110, and the service flight vehicle 112 provide wireless communication services in an area such as an urban area, for example.

On the other hand, the service flight vehicle 102, the service flight vehicle 103, the service flight vehicle 104, the service flight vehicle 105, the service flight vehicle 106, the service flight vehicle 107, the service flight vehicle 108, the service flight vehicle 109, and the service flight vehicle 111 do not function as the MEC. The service flight vehicle 102, the service flight vehicle 103, the service flight vehicle 104, the service flight vehicle 105, the service flight vehicle 106, the service flight vehicle 107, the service flight vehicle 108, the service flight vehicle 109, and the service flight vehicle 111 provide wireless communication services in an area such as a rural area, for example.

The MEC server 600 executes processing related to the wireless communication service provided by the service flight vehicle 100. The MEC server 600 does not need to communicate with the service flight vehicle 100 via the network 20 in order to execute the processing. Therefore, compared to a server on the network 20 which needs to communicate with the service flight vehicle 100 via the network 20 in order to execute the processing, the MEC server 600 can executes the processing with a lower delay. The MEC server 600 may be an example of the control device 300.

The relay flight vehicle 200 is arranged such that when the processing related to the wireless communication service provided by the service flight vehicle 100 not mounted with the MEC server 600 needs to be executed with a low delay, wireless communication connection can be made with the service flight vehicle 100, for example. In addition, the relay flight vehicle 200 may be arranged such that when it is necessary to reduce the processing load of the server on the network 20 which executes the processing related to the wireless communication service, wireless communication connection can be made with the service flight vehicle 100 providing the wireless communication service. In FIG. 3, the relay flight vehicle 200 is arranged such that wireless communication connection can be established with the gateway 50, the service flight vehicle 103 not mounted with the MEC server 600, and the service flight vehicle 107 not mounted with the MEC server 600.

The MEC server 600 mounted on the relay flight vehicle 200 may execute the processing related to the wireless communication service provided by the service flight vehicle 103. In addition, the MEC server 600 mounted on the relay flight vehicle 200 may execute the processing related to the wireless communication service provided by the service flight vehicle 107.

According to the system 10 according to the present embodiment, a wireless communication service in an area where the processing related to the wireless communication service needs to be constantly executed by the MEC server 600 is provided by the service flight vehicle 100 mounted with the MEC server 600. On the other hand, a wireless communication service in an area where the processing related to the wireless communication service does not need to be constantly executed by the MEC server 600 is provided by the service flight vehicle 100 not mounted with the MEC server 600. Then, when the processing related to the wireless communication service of the area needs to be temporarily executed by the MEC server 600, the MEC server 600 mounted on the relay flight vehicle 200 executes the processing related to the wireless communication service of the area. As a result, the system 10 according to the present embodiment can execute the processing related to the wireless communication service provided by the service flight vehicle 100 with a low delay and with a smaller number of MEC servers 600 than that in the system in which the MEC servers 600 are mounted in all the service flight vehicles 100.

In addition, according to the system 10 according to the present embodiment, when it is necessary to reduce the processing load of the server on the network 20 which executes the processing related to the wireless communication service, the MEC server 600 mounted on the relay flight vehicle 200 can execute the processing instead of the server on the network 20. As a result, the system 10 according to the present embodiment can reduce the processing load of the server on the network 20 which executes the processing related to the wireless communication service.

Figure 4:
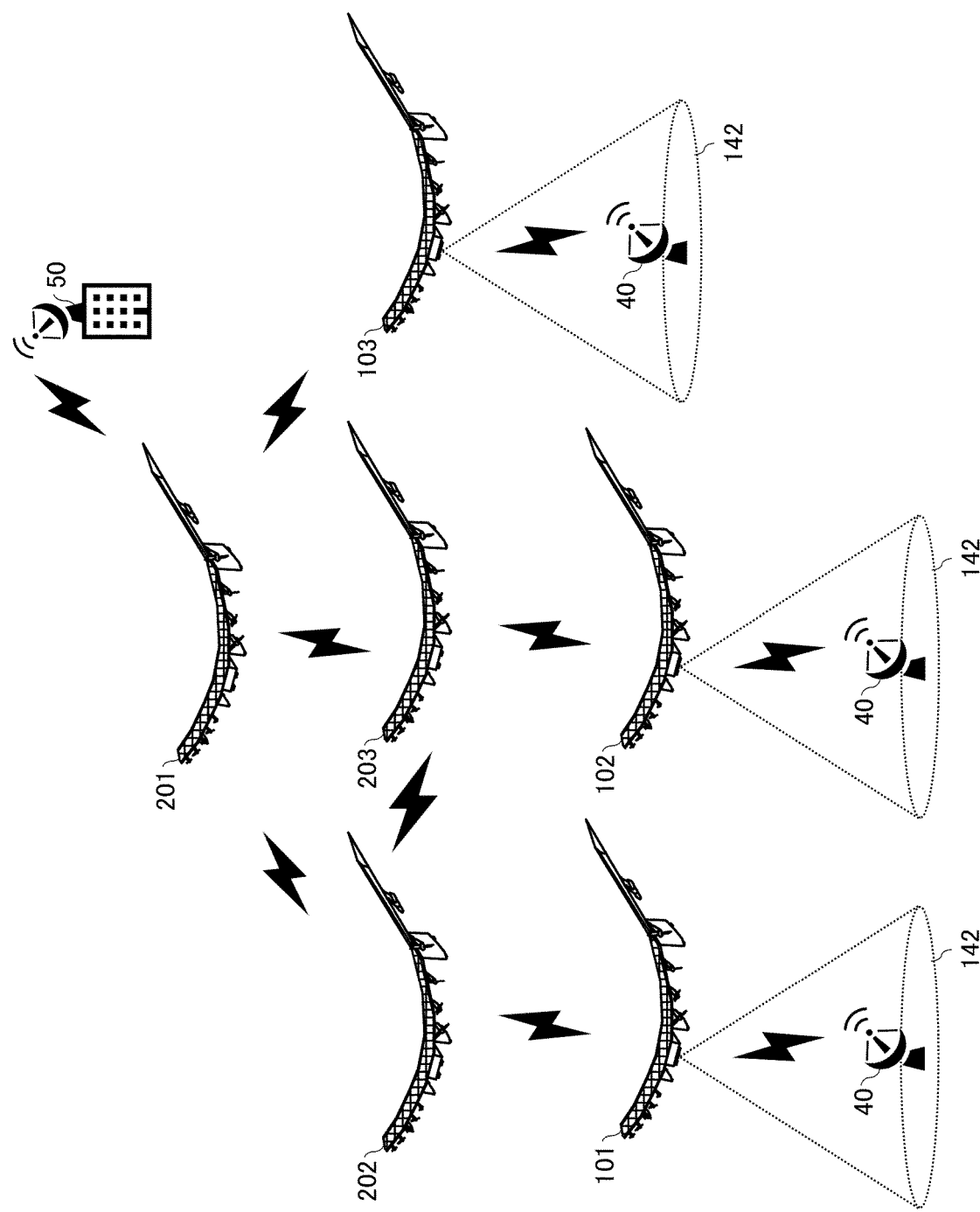
FIG. 4 is an explanatory diagram for explaining an example of arrangement of a plurality of relay flight vehicles 200.

FIG. 4 is an explanatory diagram for explaining an example of arrangement of a plurality of relay flight vehicles 200. The plurality of relay flight vehicles 200 are arranged to configure, for example, a mesh-type communication network. The plurality of relay flight vehicles 200 may be arranged to configure a ring-type communication network. In FIG. 4, the description will be given about the arrangement of the relay flight vehicle 201, the relay flight vehicle 202, and the relay flight vehicle 203.

The relay flight vehicle 201 is arranged such that wireless communication connection can be made with the gateway 50, the service flight vehicle 103, the relay flight vehicle 202, and the relay flight vehicle 203. The relay flight vehicle 202 is arranged such that wireless communication connection can be made with the service flight vehicle 101 and the relay flight vehicle 203. The relay flight vehicle 203 is arranged such that wireless communication connection can be made with the service flight vehicle 102.

The relay flight vehicle 201 relays, for example, communication between the service flight vehicle 103 and the gateway 50. The relay flight vehicle 201 relays, for example, communication between the relay flight vehicle 202 and the gateway 50. The relay flight vehicle 201 relays, for example, communication between the relay flight vehicle 203 and the gateway 50.

The relay flight vehicle 201 may relay communication between the service flight vehicle 103 and the relay flight vehicle 202. The relay flight vehicle 201 may relay communication between the service flight vehicle 103 and the relay flight vehicle 203. The relay flight vehicle 201 may relay communication between the relay flight vehicle 202 and the relay flight vehicle 203.

For example, the relay flight vehicle 201 receives a signal from the gateway 50, and transmits the signal to the service flight vehicle 103, the relay flight vehicle 202, or the relay flight vehicle 203 on the basis of the identifier information of the service flight vehicle included in the signal. In this case, the relay flight vehicle 201 functions as a router for the service flight vehicle 101, the service flight vehicle 102, and the service flight vehicle 103.

The relay flight vehicle 202 relays, for example, communication between the service flight vehicle 101 and the relay flight vehicle 201. The relay flight vehicle 202 relays, for example, communication between the relay flight vehicle 201 and the relay flight vehicle 203. The relay flight vehicle 202 may relay communication between the service flight vehicle 101 and the relay flight vehicle 203.

For example, the relay flight vehicle 202 receives a signal from the relay flight vehicle 201, and transmits the signal to the service flight vehicle 101 or the relay flight vehicle 203 on the basis of the identifier information of the service flight vehicle included in the signal. In this case, the relay flight vehicle 202 functions as a router for the service flight vehicle 101 and the service flight vehicle 102.

The relay flight vehicle 203 relays, for example, communication between the service flight vehicle 102 and the relay flight vehicle 201. The relay flight vehicle 203 relays, for example, communication between the relay flight vehicle 201 and the relay flight vehicle 202. The relay flight vehicle 203 may relay communication between the service flight vehicle 102 and the relay flight vehicle 202.

For example, the relay flight vehicle 203 receives a signal from the relay flight vehicle 201, and transmits the signal to the service flight vehicle 102 or the relay flight vehicle 202 on the basis of the identifier information of the service flight vehicle included in the signal. In this case, the relay flight vehicle 203 functions as a router for the service flight vehicle 101 and the service flight vehicle 102.

In FIG. 4, the relay flight vehicle 200 may be added to the communication networks of the relay flight vehicle 201, the relay flight vehicle 202, and the relay flight vehicle 203. The additional relay flight vehicle 200 is arranged to configure a mesh-type communication network together with the relay flight vehicle 201, the relay flight vehicle 202, and the relay flight vehicle 203, for example. The additional relay flight vehicle 200 may be arranged to configure a ring-type communication network together with the relay flight vehicle 201, the relay flight vehicle 202, and the relay flight vehicle 203.

According to the system 10 according to the present embodiment, the plurality of relay flight vehicles 200 are arranged to configure a mesh-type or ring-type communication network. As a result, the system 10 according to the present embodiment can increase the redundancy of the communication network from the gateway 50 on the ground to the plurality of service flight vehicles 100.

Figure 5:
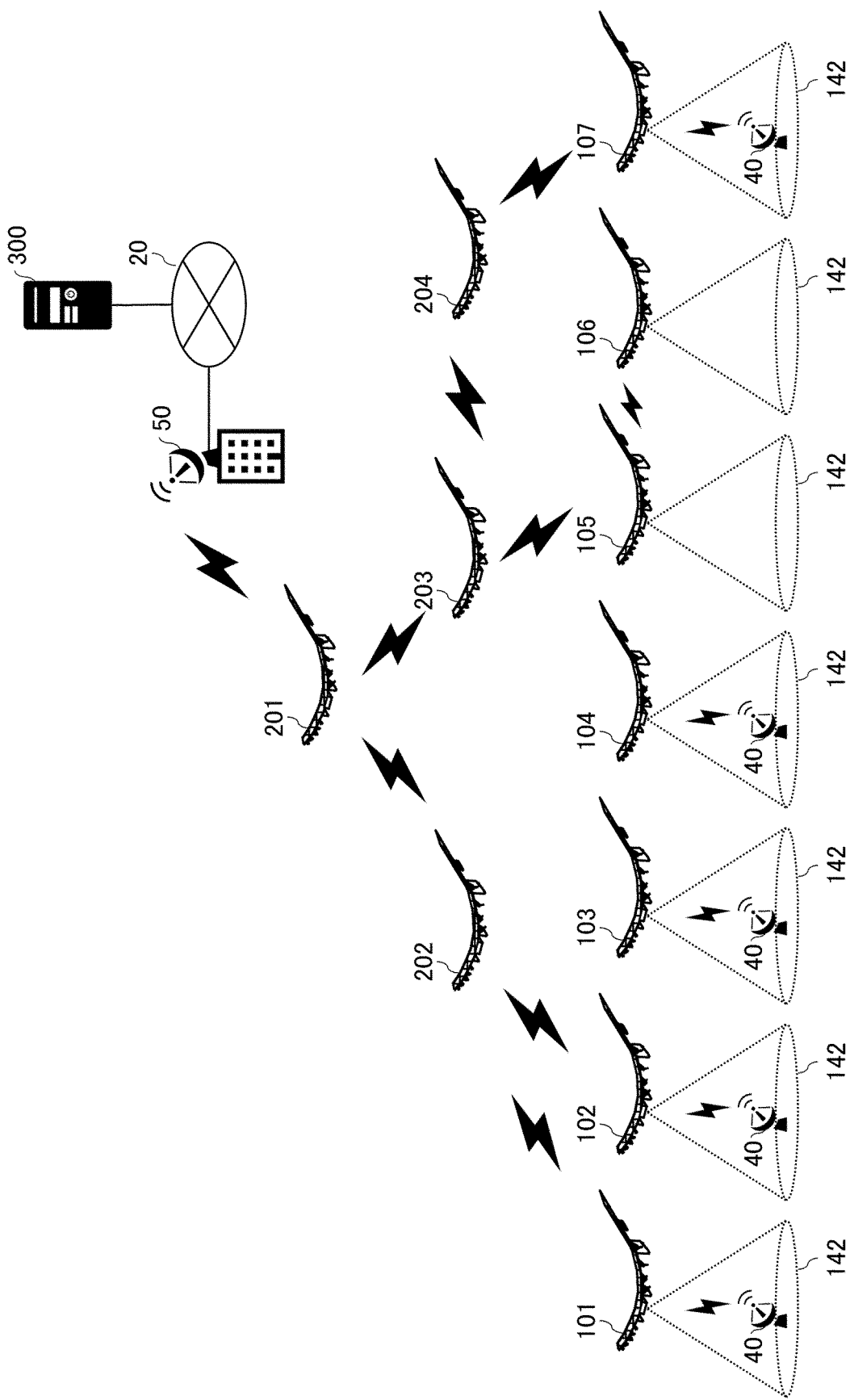
FIG. 5 is an explanatory diagram for explaining an example of processing by a control device 300.

FIG. 5 is an explanatory diagram for explaining an example of processing by the control device 300. Here, the description will be given about the processing of the control device 300 when the control device 300 allocates the communication capacity of the relay flight vehicle 201.

The gateway 40 is installed in the wireless communication area 142 formed by each of the service flight vehicle 101, the service flight vehicle 102, the service flight vehicle 103, the service flight vehicle 104, and the service flight vehicle 107. Each of the service flight vehicle 101, the service flight vehicle 102, the service flight vehicle 103, the service flight vehicle 104, and the service flight vehicle 107 establishes wireless communication connection with the gateway 40 in the wireless communication area 142. Here, the description will be continued on the assumption that each of the communication capacities of the service flight vehicle 101, the service flight vehicle 102, the service flight vehicle 103, the service flight vehicle 104, and the service flight vehicle 107 before the control device 300 allocates the communication capacity of the relay flight vehicle 201 is 1000 Mbps.

On the other hand, the gateway 40 is not installed in the wireless communication area 142 formed by each of the service flight vehicle 105 and the service flight vehicle 106. In addition, the service flight vehicle 105 and the service flight vehicle 106 establish wireless communication connection.

The relay flight vehicle 201 is arranged such that wireless communication connection can be made with the gateway 50, the relay flight vehicle 202, and the relay flight vehicle 203. The relay flight vehicle 202 is arranged such that wireless communication connection can be made with the service flight vehicle 101 and the service flight vehicle 102. The relay flight vehicle 203 is arranged such that wireless communication connection can be made with the service flight vehicle 105 and the relay flight vehicle 204. The relay flight vehicle 204 is arranged such that wireless communication connection can be made with the service flight vehicle 107.

The relay flight vehicle 200 establishing wireless communication connection with the gateway 50 may be a master relay flight vehicle. In FIG. 5, the relay flight vehicle 201 is a master relay flight vehicle. On the other hand, the relay flight vehicle 200 not establishing wireless communication connection with the gateway 50 may be a slave relay flight vehicle. In FIG. 5, the relay flight vehicle 202, the relay flight vehicle 203, and the relay flight vehicle 204 are slave relay flight vehicles.

The control device 300 may control the relay flight vehicles 201 to 204 in order to allocate the communication capacity of wireless communication between the relay flight vehicle 201 and the gateway 50 on the ground to the service flight vehicle 101, the service flight vehicle 102, the service flight vehicle 105, the service flight vehicle 106, and the service flight vehicle 107. Here, the description will be continued on the assumption that the communication capacity of the relay flight vehicle 201 is a sum (1000 Mbps+1000 Mbps=2000 Mbps) of the communication capacity (=1000 Mbps) of the left-handed polarized radio wave and the communication capacity (=1000 Mbps) of the right-handed polarized radio wave.

For example, the control device 300 controls the relay flight vehicle 201 to allocate the communication capacity of the relay flight vehicle 201 to the relay flight vehicle 202 and the relay flight vehicle 203 on the basis of the priority of the wireless communication area 142 formed by each of the service flight vehicle 101, the service flight vehicle 102, the service flight vehicle 105, the service flight vehicle 106, and the service flight vehicle 107. The relay flight vehicle 201 allocates the communication capacity of the relay flight vehicle 201 to the relay flight vehicle 202 and the relay flight vehicle 203 under the control of the control device 300. Here, the description will be continued on the assumption that the relay flight vehicle 201 allocates a communication capacity of 750 Mbps out of the communication capacity of 2000 Mbps to the relay flight vehicle 202 and allocates a communication capacity of 1250 Mbps to the relay flight vehicle 203.

Next, the control device 300 controls the relay flight vehicle 202 to further allocate the communication capacity allocated to the relay flight vehicle 202 to the service flight vehicle 101 and the service flight vehicle 102 on the basis of the priority of the wireless communication area 142 formed by each of the service flight vehicle 101 and the service flight vehicle 102. The relay flight vehicle 202 further allocates the communication capacity allocated to the relay flight vehicle 202 to the service flight vehicle 101 and the service flight vehicle 102 under the control of the control device 300. Here, the description will be continued on the assumption that the relay flight vehicle 202 allocates a communication capacity of 250 Mbps out of the communication capacity of 750 Mbps to the service flight vehicle 101 and allocates a communication capacity of 500 Mbps to the service flight vehicle 102.

Next, the control device 300 controls the relay flight vehicle 203 to further allocate the communication capacity allocated to the relay flight vehicle 203 to the service flight vehicle 105 and the relay flight vehicle 204 on the basis of the priority of the wireless communication area 142 formed by each of the service flight vehicle 105, the service flight vehicle 106, and the service flight vehicle 107. The relay flight vehicle 203 further allocates the communication capacity allocated to the relay flight vehicle 203 to the service flight vehicle 105 and the relay flight vehicle 204 under the control of the control device 300. Here, the description will be continued on the assumption that the relay flight vehicle 203 allocates a communication capacity of 250 Mbps out of the communication capacity of 1250 Mbps to the service flight vehicle 105 and allocates a communication capacity of 1000 Mbps to the relay flight vehicle 204.

Next, the control device 300 controls the relay flight vehicle 204 to allocate the communication capacity allocated to the relay flight vehicle 204 to the service flight vehicle 107. The relay flight vehicle 204 allocates the communication capacity allocated to the relay flight vehicle 204 to the service flight vehicle 107 under the control of the control device 300. Here, the description will be continued on the assumption that the relay flight vehicle 204 allocates a communication capacity of 1000 Mbps to the service flight vehicle 107.

Next, the control device 300 controls the service flight vehicle 105 to further allocate the communication capacity allocated to the service flight vehicle 105 to the service flight vehicle 106 on the basis of the priority of the wireless communication area 142 formed by each of the service flight vehicle 105 and the service flight vehicle 106. The service flight vehicle 105 further allocates the communication capacity allocated to the service flight vehicle 105 to the service flight vehicle 106 under the control of the control device 300. Here, the description will be continued on the assumption that the service flight vehicle 105 allocates 50 Mbps out of the communication capacity of 250 Mbps to the service flight vehicle 106.

Through the above-described processing, the allocation of the communication capacity of the relay flight vehicle 201 is completed. The communication capacities of the service flight vehicles 101 to 107 after the allocation of the communication capacities of the relay flight vehicle 201 is completed are as follows.

The communication capacity of the service flight vehicle 101 is 1000 Mbps+250 Mbps=1250 Mbps. The communication capacity of the service flight vehicle 102 is 1000 Mbps+500 Mbps=1500 Mbps.

The communication capacity of the service flight vehicle 103 is 1000 Mbps. The communication capacity of the service flight vehicle 104 is 1000 Mbps.

The communication capacity of the service flight vehicle 105 is 200 Mbps. The communication capacity of the service flight vehicle 106 is 50 Mbps. The communication capacity of the service flight vehicle 107 is 1000 Mbps+1000 Mbps=2000 Mbps.

According to the system 10 according to the present embodiment, the control device 300 controls the plurality of relay flight vehicles 200 to allocate the communication capacity of the master relay flight vehicle to the plurality of service flight vehicles 100 on the basis of the priority of the wireless communication area 142 formed by each of the plurality of service flight vehicles 100. As a result, the system 10 according to the present embodiment can appropriately allocate the communication capacity to the plurality of service flight vehicles 100 in consideration of the priority of the wireless communication area 142 formed by each of the plurality of service flight vehicles 100.

Figure 6:
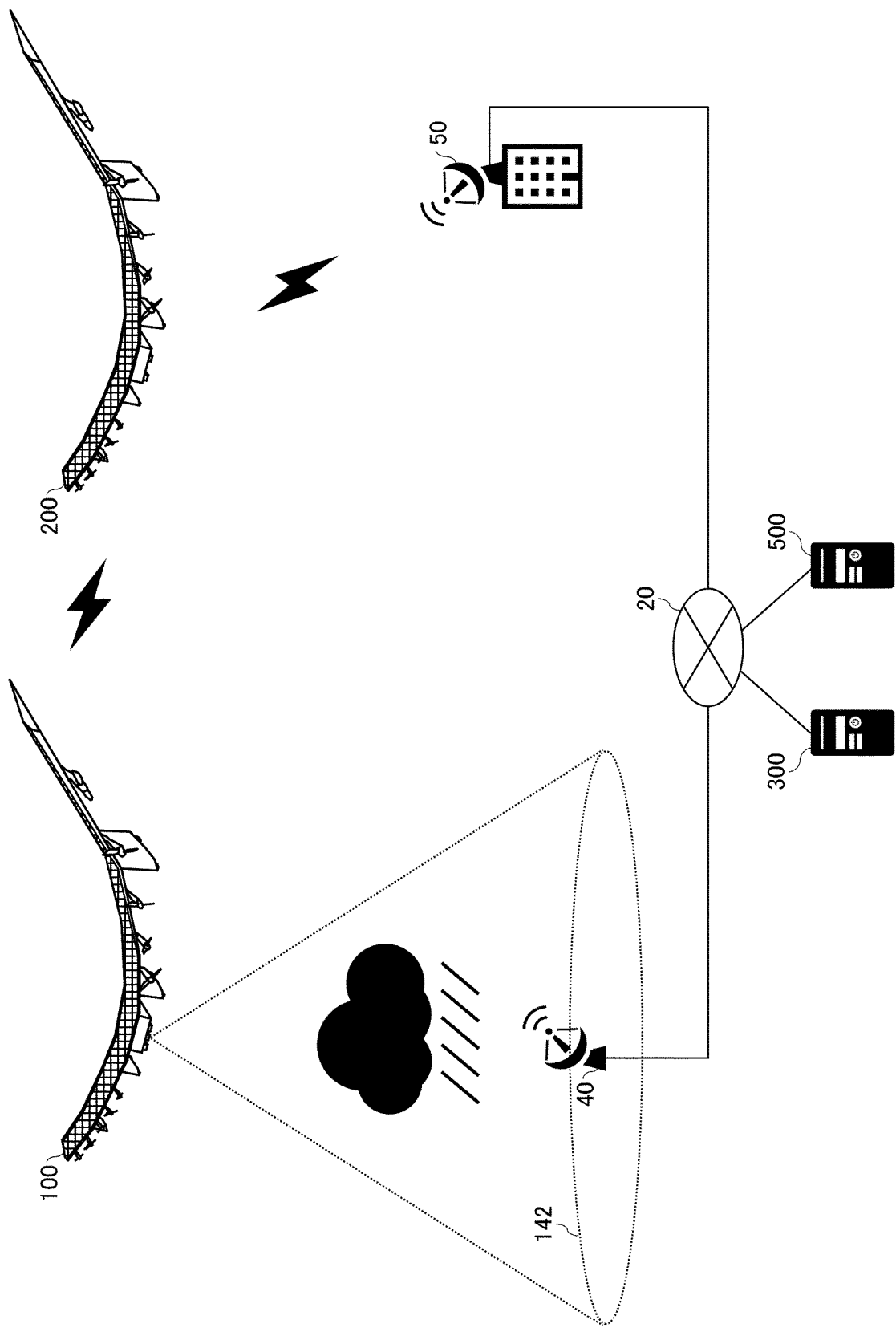
FIG. 6 is an explanatory diagram for explaining another example of the processing by the control device 300.

FIG. 6 is an explanatory diagram for explaining another example of the processing by the control device 300. Here, the description will be given about the processing of the control device 300 when the weather in the wireless communication area 142 formed by the service flight vehicle 100 is bad.

The control device 300 receives weather-related information on the weather in the wireless communication area 142 formed by the service flight vehicle 100 from the weather-related information management server 500 via the network 20. The control device 300 determines whether the wireless communication area 142 is in bad weather on the basis of the received weather-related information. Here, the description will be continued on the assumption that the control device 300 determines that the wireless communication area 142 is in bad weather.

In response to determining that the wireless communication area 142 is in bad weather, the control device 300 determines the arrangement of the relay flight vehicle 200 such that wireless communication connection can be established with both the service flight vehicle 100 forming the wireless communication area 142 and the gateway 50 on the ground. Thereafter, the control device 300 controls the relay flight vehicle 200 to move according to the determined arrangement and establish wireless communication connection with both the service flight vehicle 100 and the gateway 50 on the ground. Under the control of the control device 300, the relay flight vehicle 200 starts moving, establishes wireless communication connection with both the service flight vehicle 100 and the gateway 50 on the ground, and relays communication between the service flight vehicle 100 and the gateway 50 on the ground.

Radio waves in a frequency band susceptible to rain or the like are used for wireless communication between the service flight vehicle 100 and the gateway 40. Therefore, when the weather in the wireless communication area 142 is bad, the service flight vehicle 100 forming the wireless communication area 142 may not be able to normally perform wireless communication with the gateway 40.

On the other hand, according to the system 10 according to the present embodiment, when it is determined that the wireless communication area 142 is in bad weather, the control device 300 controls the relay flight vehicle 200 to relay communication between the service flight vehicle 100 forming the wireless communication area 142 and the gateway 50 on the ground. As a result, the service flight vehicle 100 can access the network 20 via the relay flight vehicle 200 and the gateway 50 on the ground. As described above, the system 10 according to the present embodiment can provide a wireless communication service to the wireless communication area 142 even when the wireless communication area 142 is in bad weather.

Figure 7:
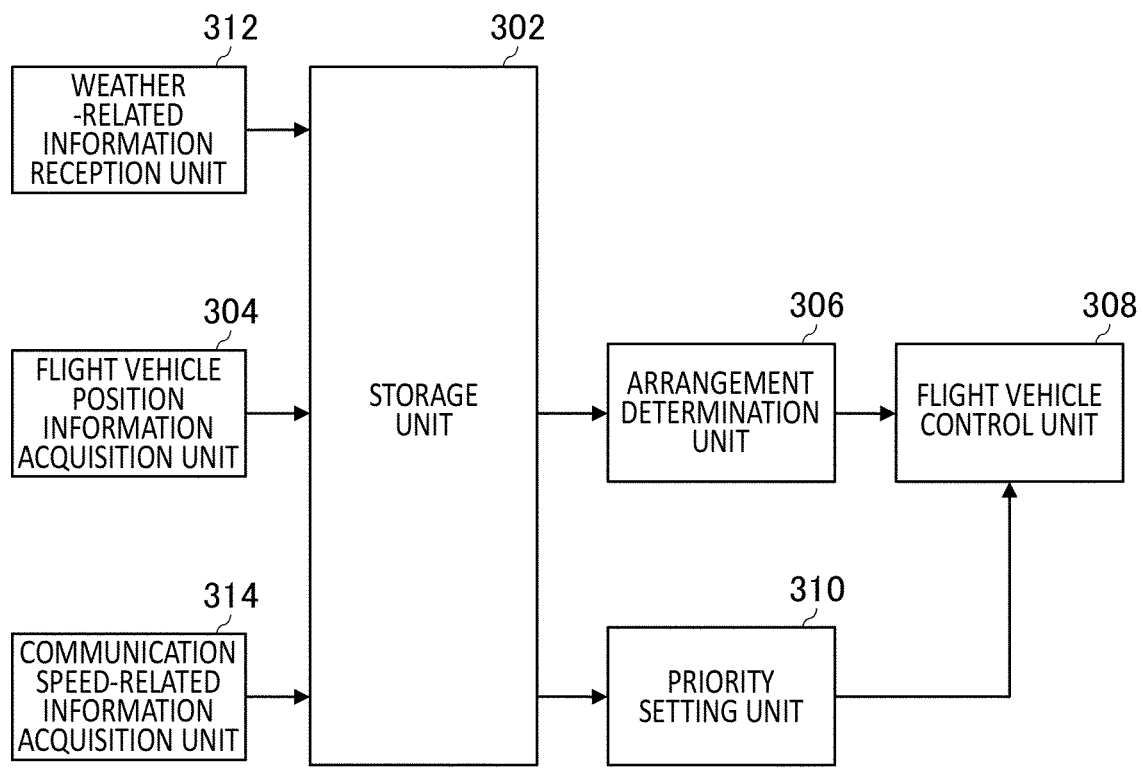
FIG. 7 schematically illustrates an example of a functional configuration of the control device 300.

FIG. 7 schematically illustrates an example of a functional configuration of the control device 300. The control device 300 includes a storage unit 302, a flight vehicle position information acquisition unit 304, an arrangement determination unit 306, a flight vehicle control unit 308, a priority setting unit 310, a weather-related information reception unit 312, and a communication speed-related information acquisition unit 314. Note that the control device 300 is not necessarily required to include all these configurations.

The storage unit 302 stores various types of information. The storage unit 302 stores, for example, installation position information indicating an installation position of the gateway 50.

The flight vehicle position information acquisition unit 304 acquires the position information of the flight vehicle. The flight vehicle position information acquisition unit 304 acquires, for example, service flight vehicle position information indicating the positions of the plurality of service flight vehicles 100. For example, the flight vehicle position information acquisition unit 304 acquires the service flight vehicle position information by receiving, via the communication device 150 mounted on each of the plurality of service flight vehicles 100, the position information of the service flight vehicle 100 mounted with the communication device 150. The flight vehicle position information acquisition unit 304 stores the acquired service flight vehicle position information in the storage unit 302.

The flight vehicle position information acquisition unit 304 may acquire relay flight vehicle position information indicating the position of the relay flight vehicle 200. For example, the flight vehicle position information acquisition unit 304 acquires the relay flight vehicle position information by receiving the position information of the relay flight vehicle 200 via the relay device 250 mounted on the relay flight vehicle 200. The flight vehicle position information acquisition unit 304 stores the acquired relay flight vehicle position information in the storage unit 302.

The arrangement determination unit 306 determines the arrangement of the relay flight vehicle 200. The arrangement determination unit 306 determines the arrangement of the relay flight vehicle 200 which relays communication of one service flight vehicle 100 among the plurality of service flight vehicles 100 on the basis of, for example, predetermined conditions and the service flight vehicle position information stored in the storage unit 302. The arrangement determination unit 306 may determine the arrangement of the relay flight vehicle 200 further on the basis of the installation position information stored in the storage unit 302. The arrangement determination unit 306 may determine the arrangement of the relay flight vehicle 200 further on the basis of the relay flight vehicle position information stored in the storage unit 302.

For example, the arrangement determination unit 306 determines the arrangement of the relay flight vehicle 200 such that wireless communication connection can be established with both one service flight vehicle 100 among the plurality of service flight vehicles 100 and the gateway 50 on the ground. The arrangement determination unit 306 may determine the arrangement of the relay flight vehicle 200 such that a distance between the relay flight vehicle 200 and the gateway 50 becomes shorter within a range where wireless communication connection can be established with both the one service flight vehicle 100 and the gateway 50.

For example, when a distance between one service flight vehicle 100 of the plurality of service flight vehicles 100 and the relay flight vehicle 200 is shorter than a predetermined distance threshold, the arrangement determination unit 306 determines that the relay flight vehicle 200 can establish wireless communication connection with the one service flight vehicle 100. For example, when a distance between the gateway 50 and the relay flight vehicle 200 is shorter than a predetermined distance threshold, the arrangement determination unit 306 determines that the relay flight vehicle 200 can establish wireless communication connection with the gateway 50.

For example, the arrangement determination unit 306 determines the arrangement of the relay flight vehicle 200 such that wireless communication connection can be established with both one service flight vehicle 100 and another service flight vehicle 100 among the plurality of service flight vehicles 100. The arrangement determination unit 306 may determine the arrangement of the relay flight vehicle 200 such that wireless communication connection can be established with both the one service flight vehicle 100 and another relay flight vehicle 200. For example, when a distance between the relay flight vehicle 200 and another relay flight vehicle 200 is shorter than a predetermined distance threshold, the arrangement determination unit 306 determines that the relay flight vehicle 200 can establish wireless communication connection with the another relay flight vehicle 200.

The flight vehicle control unit 308 controls a flight vehicle. The flight vehicle control unit 308 controls, for example, the service flight vehicle 100. The flight vehicle control unit 308 controls, for example, the relay flight vehicle 200.

The flight vehicle control unit 308 controls the service flight vehicle 100 by, for example, generating service flight vehicle control information for controlling the service flight vehicle 100 and transmitting the generated service flight vehicle control information to the service flight vehicle 100. The service flight vehicle control information includes, for example, control information for controlling the flight of the service flight vehicle 100. The service flight vehicle control information may include control information for controlling the communication device 150 mounted on the service flight vehicle 100.

For example, the flight vehicle control unit 308 forms the wireless communication area 142, and controls the service flight vehicle 100 to provide a wireless communication service to the user terminal 400 in the wireless communication area 142. Under the control of the control device 300, the service flight vehicle 100 forms the wireless communication area 142 and provides a wireless communication service to the user terminal 400 in the wireless communication area 142.

The flight vehicle control unit 308 controls the relay flight vehicle 200 by, for example, generating relay flight vehicle control information for controlling the relay flight vehicle 200 and transmitting the generated relay flight vehicle control information to the relay flight vehicle 200. The relay flight vehicle control information includes, for example, control information for controlling the flight of the relay flight vehicle 200. The relay flight vehicle control information may include control information for controlling the relay device 250 mounted on the relay flight vehicle 200.

For example, the flight vehicle control unit 308 controls the relay flight vehicle 200 to move according to the arrangement determined by the arrangement determination unit 306 and establish wireless communication connection with one service flight vehicle 100 among the plurality of service flight vehicles 100. For example, when the arrangement determination unit 306 determines the arrangement of the relay flight vehicle 200 such that wireless communication connection can be established with both the one service flight vehicle 100 and the gateway 50 on the ground, the flight vehicle control unit 308 further controls the relay flight vehicle 200 to relay communication between the one service flight vehicle 100 and the gateway 50.

For example, when the arrangement determination unit 306 determines the arrangement of the relay flight vehicle 200 such that wireless communication connection can be established with both one service flight vehicle 100 and another service flight vehicle 100 among the plurality of service flight vehicles 100, the flight vehicle control unit 308 further controls the relay flight vehicle 200 to establish wireless communication connection with the another service flight vehicle 100 and relay communication between the one service flight vehicle 100 and the another service flight vehicle 100. For example, when the arrangement determination unit 306 determines the arrangement of the relay flight vehicle 200 such that wireless communication connection can be established with both the one service flight vehicle 100 and another relay flight vehicle 200, the flight vehicle control unit 308 further controls the relay flight vehicle 200 to establish wireless communication connection with the another relay flight vehicle 200 and relay communication between the one service flight vehicle 100 and the another relay flight vehicle 200.

The priority setting unit 310 sets the priority of the wireless communication area 142 formed by each of the plurality of service flight vehicles 100. For example, the priority setting unit 310 sets the priority of the wireless communication area 142 formed by each of the plurality of service flight vehicles 100 wirelessly communicatively connected to the relay flight vehicle 200 of which the arrangement has been determined by the arrangement determination unit 306. For example, the priority setting unit 310 sets the priority of the wireless communication area 142 by an input device (not illustrated) included in the control device 300 accepting the input of the priority of the wireless communication area 142.

The flight vehicle control unit 308 may control the relay flight vehicle 200 on the basis of the priority set by the priority setting unit 310. For example, the flight vehicle control unit 308 controls the relay flight vehicle 200 to allocate a predetermined communication capacity to the plurality of service flight vehicles 100. The flight vehicle control unit 308 may control the service flight vehicle 100 on the basis of the priority set by the priority setting unit 310. For example, the flight vehicle control unit 308 controls the service flight vehicle 100 to allocate a predetermined communication capacity to another service flight vehicle 100.

The predetermined communication capacity is, for example, the communication capacity of the master relay flight vehicle. The predetermined communication capacity is, for example, the communication capacity of the slave relay flight vehicle. The predetermined communication capacity may be, for example, the communication capacity of the service flight vehicle 100.

The weather-related information reception unit 312 receives the weather-related information from the weather-related information management server 500 via the network 20. The weather-related information includes, for example, rainfall information indicating a rainfall in the wireless communication area 142 formed by each of the plurality of service flight vehicles 100. The weather-related information includes, for example, predicted rainfall information indicating a predicted rainfall in the wireless communication area 142 formed by each of the plurality of service flight vehicles 100. The weather-related information reception unit 312 stores the received weather-related information in the storage unit 302.

The arrangement determination unit 306 may determine the arrangement of the relay flight vehicle 200 further on the basis of the weather-related information stored in the storage unit 302. For example, the arrangement determination unit 306 determines the arrangement of the relay flight vehicle 200 which relays communication of the service flight vehicle 100 of which the formed wireless communication area 142 is in bad weather.

For example, the arrangement determination unit 306 determines the arrangement of the relay flight vehicle 200 which relays communication of one service flight vehicle 100, of which the formed wireless communication area 142 has a rainfall larger than a predetermined rainfall threshold, among the plurality of service flight vehicles 100. The arrangement determination unit 306 may determine the arrangement of the relay flight vehicle 200 which relays communication of one service flight vehicle 100, of which the formed wireless communication area 142 has a predicted rainfall larger than a predetermined predicted rainfall threshold, among the plurality of service flight vehicles 100.

The communication speed-related information acquisition unit 314 acquires communication speed-related information on the communication speeds of the plurality of service flight vehicles 100. For example, the communication speed-related information acquisition unit 314 acquires the communication speed-related information by receiving, via the communication device 150 mounted on each of the plurality of service flight vehicles 100, the communication speed information of the service flight vehicle 100 mounted with the communication device 150. The communication speed-related information acquisition unit 314 stores the acquired communication speed-related information in the storage unit 302.

The communication speed information includes, for example, information indicating a communication speed between the service flight vehicle 100 and the user terminal 400. The communication speed information includes, for example, information indicating an average communication speed of communication speeds between the service flight vehicle 100 and the plurality of user terminals 400. The communication speed information may include information indicating a communication speed between the service flight vehicle 100 and the gateway 40 on the ground.

The arrangement determination unit 306 may determine the arrangement of the relay flight vehicle 200 further on the basis of the communication speed-related information stored in the storage unit 302. In this case, the arrangement determination unit 306 may determine the arrangement of the relay flight vehicle 200 on which the MEC server 600 is mounted.

For example, the arrangement determination unit 306 determines the arrangement of the relay flight vehicle 200 which relays communication of one service flight vehicle 100, which has a communication speed with the user terminal 400 lower than a first communication speed threshold, among the plurality of service flight vehicles 100. For example, the arrangement determination unit 306 determines the arrangement of the relay flight vehicle 200 which relays communication of one service flight vehicle 100, which has the average communication speed of communication speeds with the plurality of user terminals 400 lower than an average communication speed threshold, among the plurality of service flight vehicles 100. The arrangement determination unit 306 may determine the arrangement of the relay flight vehicle 200 which relays communication of one service flight vehicle 100, which has a communication speed with the gateway 40 on the ground lower than a second communication speed threshold, among the plurality of service flight vehicles 100.

Figure 8:
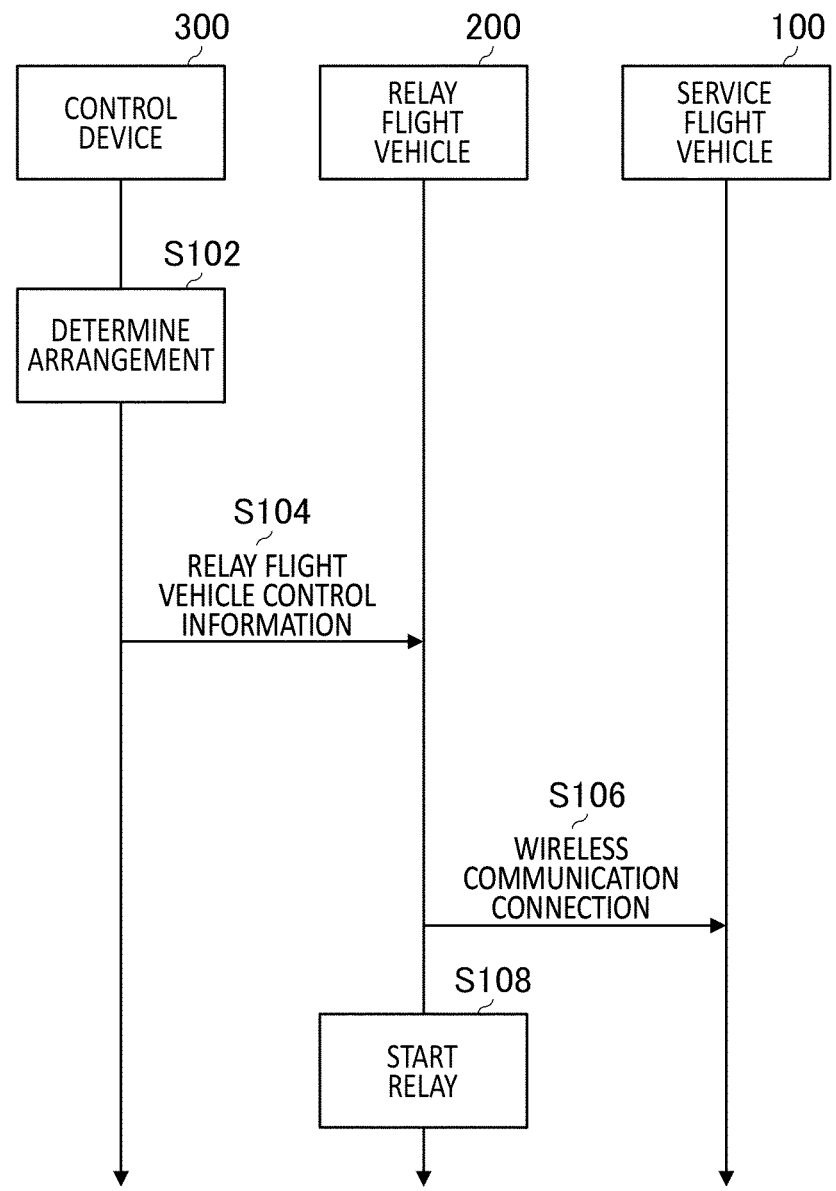
FIG. 8 is an explanatory diagram for explaining an example of a flow of processing of a service flight vehicle 100, the relay flight vehicle 200, and the control device 300.

FIG. 8 is an explanatory diagram for explaining an example of a flow of processing of the service flight vehicle 100, the relay flight vehicle 200, and the control device 300. In FIG. 8, a state where the storage unit 302 stores the service flight vehicle position information will be described as a start state.

In step (the step may be abbreviated as S) 102, the arrangement determination unit 306 determines the arrangement of the relay flight vehicle 200 which relays communication of one service flight vehicle 100 among the plurality of service flight vehicles 100. In S104, the flight vehicle control unit 308 generates relay flight vehicle control information in order to move the relay flight vehicle 200 according to the arrangement determined by the arrangement determination unit 306 and establish wireless communication connection with the one service flight vehicle 100. The flight vehicle control unit 308 transmits the generated relay flight vehicle control information to the relay flight vehicle 200.

In S106, the relay flight vehicle 200 receives the relay flight vehicle control information from the control device 300. The relay flight vehicle 200 starts moving according to the received relay flight vehicle control information. In response to the completion of the movement, the relay flight vehicle 200 establishes wireless communication connection with the one service flight vehicle 100. In S108, the relay flight vehicle 200 starts relaying communication of the one service flight vehicle 100.

Figure 9:
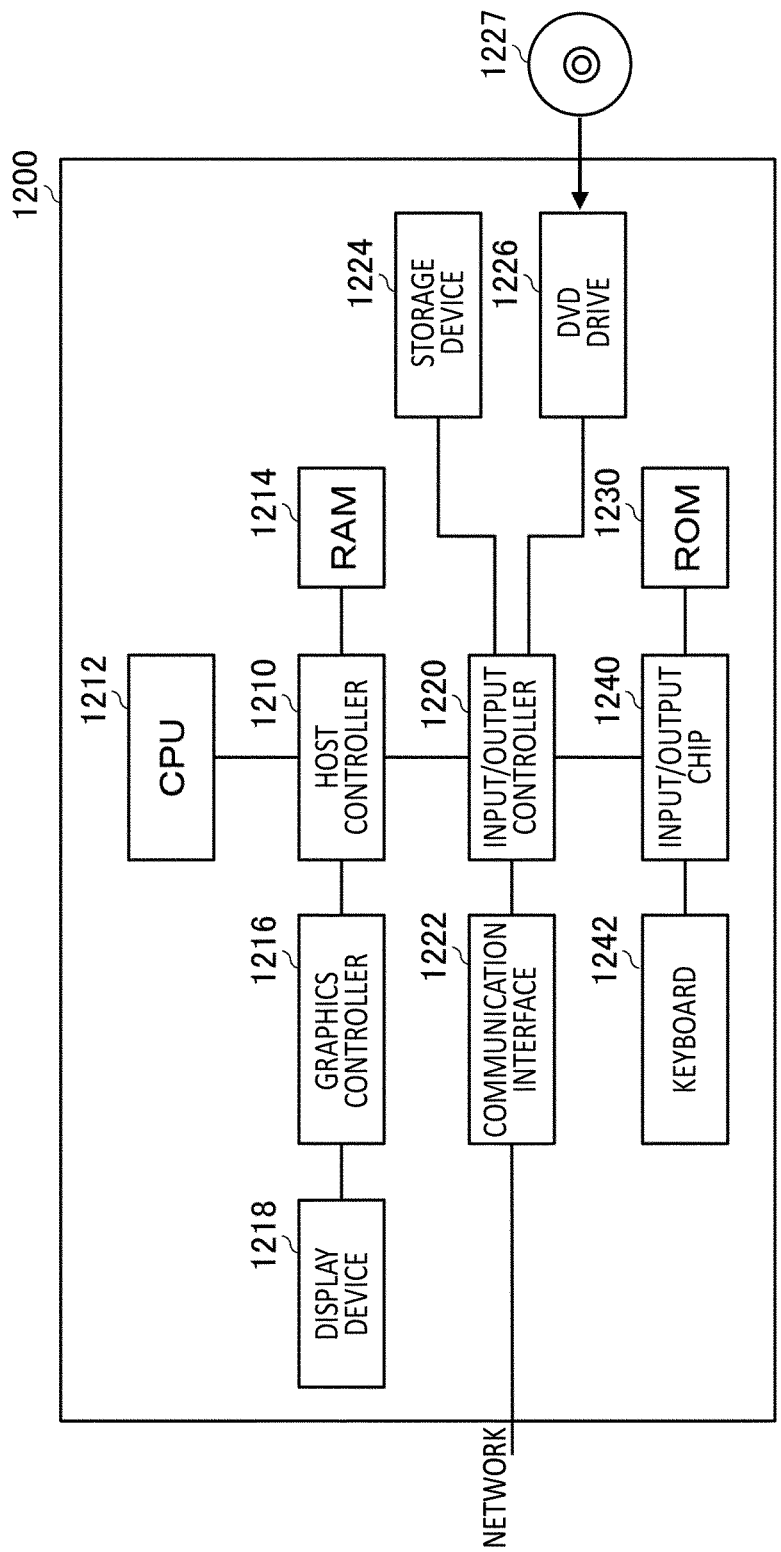
FIG. 9 schematically illustrates an example of a hardware configuration of a computer 1200 that functions as the control device 300.

FIG. 9 schematically illustrates an example of a hardware configuration of a computer 1200 that functions as the control device 300. Programs installed in the computer 1200 can cause the computer 1200 to function as one or more "units" of the device according to the above described embodiment or can cause the computer 1200 to execute operations associated with the devices according to the above described embodiment or the one or more "units", and/or can cause the computer 1200 to execute a process according to the above described embodiment or steps of the process. Such a program may be executed by a CPU 1212 to cause the computer 1200 to perform specific operations associated with some or all of the blocks in the flowcharts and block diagrams described in the specification.

The computer 1200 according to the present embodiment includes a CPU 1212, a RAM 1214, and a graphics controller 1216, which are connected to each other via a host controller 1210. The computer 1200 also includes input/output units such as a communication interface 1222, a storage device 1224, a DVD drive 1226 and an IC card drive, which are connected to the host controller 1210 via an input/output controller 1220. The DVD drive 1226 may be a DVD-ROM drive, a DVD-RAM drive, and the like. The storage device 1224 may be a hard disk drive, a solid-state drive, and the like. The computer 1200 also includes legacy input/output units such as a ROM 1230 and a keyboard 1242, which are connected to the input/output controller 1220 through an input/output chip 1240.

The CPU 1212 operates according to the programs stored in the ROM 1230 and the RAM 1214, thereby controlling each unit. The graphics controller 1216 obtains image data which is generated, by the CPU 1212, in a frame buffer or the like provided in the RAM 1214 or in itself so as to cause the image data to be displayed on a display device 1218.

The communication interface 1222 communicates with other electronic devices via a network. The storage device 1224 stores a program and data used by the CPU 1212 in the computer 1200. The DVD drive 1226 is configured to read the programs or the data from the DVD-ROM 1227 or the like, and to provide the storage device 1224 with the programs or the data. The IC card drive reads the program and data from an IC card, and/or writes the program and data to the IC card.

The ROM 1230 stores therein a boot program or the like executed by the computer 1200 at the time of activation, and/or a program depending on the hardware of the computer 1200. The input/output chip 1240 may also connect various input/output units via a USB port, a parallel port, a serial port, a keyboard port, a mouse port, or the like to the input/output controller 1220.

A program is provided by a computer-readable storage medium such as a DVD-ROM 1227 or an IC card. The program is read from the computer readable storage medium, installed into the storage device 1224, RAM 1214, or ROM 1230, which are also examples of a computer readable storage medium, and executed by the CPU 1212. Information processing written in these programs is read by the computer 1200, and provides cooperation between the programs and the various types of hardware resources described above. A device or method may be constituted by realizing the operation or processing of information in accordance with the use of the computer 1200.

For example, in a case where a communication is performed between the computer 1200 and an external device, the CPU 1212 may execute a communication program loaded in the RAM 1214 and instruct the communication interface 1222 to perform communication processing based on a process written in the communication program. The communication interface 1222, under control of the CPU 1212, reads transmission data stored on a transmission buffer region provided in a recording medium such as the RAM 1214, the storage device 1224, the DVD-ROM 1227, or the IC card, and transmits the read transmission data to a network or writes reception data received from a network to a reception buffer region or the like provided on the recording medium.

In addition, the CPU 1212 may be configured to cause all or a necessary portion of a file or a database, which has been stored in an external recording medium such as the storage device 1224, the DVD drive 1226 (DVD-ROM 1227), the IC card and the like, to be read into the RAM 1214, thereby executing various types of processing on the data on the RAM 1214. Then, the CPU 1212 may write the processed data back in the external recording medium.

Various types of information, such as various types of programs, data, tables, and databases, may be stored in the recording medium to undergo information processing. The CPU 1212 may execute, on the data read from the RAM 1214, various types of processing including various types of operations, information processing, conditional judgement, conditional branching, unconditional branching, information retrieval/replacement, or the like described throughout the present disclosure and specified by instruction sequences of the programs, to write the results back to the RAM 1214. In addition, the CPU 1212 may retrieve information in a file, a database, or the like in the recording medium. For example, when a plurality of entries, each having an attribute value of a first attribute associated with an attribute value of a second attribute, are stored in the recording medium, the CPU 1212 may search for an entry whose attribute value of the first attribute matches a designated condition, from among the plurality of entries, and read the attribute value of the second attribute stored in the entry, thereby obtaining the attribute value of the second attribute associated with the first attribute satisfying a predetermined condition.

The programs or software module described above may be stored on the computer 1200 or in a computer readable storage medium near the computer 1200. In addition, a recording medium such as a hard disk or a RAM provided in a server system connected to a dedicated communication network or the Internet can be used as the computer readable storage medium, thereby providing the program to the computer 1200 via the network.

Blocks in flowcharts and block diagrams in the present embodiments may represent steps of processes in which operations are performed or "units" of devices responsible for performing operations. A specific step and "unit" may be implemented by dedicated circuitry, programmable circuitry supplied along with a computer readable instruction stored on a computer readable storage medium, and/or a processor supplied along with the computer readable instruction stored on the computer readable storage medium. The dedicated circuitry may include a digital and/or analog hardware circuit, or may include an integrated circuit (IC) and/or a discrete circuit. The programmable circuitry may include, for example, a reconfigurable hardware circuit including logical AND, logical OR, logical XOR, logical NAND, logical NOR, and other logical operations, and a flip-flop, a register, and a memory element, such as a field-programmable gate array (FPGA) and a programmable logic array (PLA).

The computer readable storage medium may include any tangible device capable of storing an instruction performed by an appropriate device, so that the computer readable storage medium having the instruction stored thereon constitutes a product including an instruction that may be performed in order to provide means for performing an operation specified by a flowchart or a block diagram. Examples of the computer readable storage medium may include an electronic storage medium, a magnetic storage medium, an optical storage medium, an electromagnetic storage medium, a semiconductor storage medium, and the like. More specific examples of the computer-readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disc (DVD), a Blu-ray (registered trademark) disc, a memory stick, an integrated circuit card, or the like.

The computer readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object-oriented programming language such as Smalltalk (registered trademark), JAVA (registered trademark), and C++, and a conventional procedural programming language such as a "C" programming language or a similar programming language.

The computer readable instruction may be provided to a general purpose computer, a special purpose computer, or a processor or programmable circuitry of another programmable data processing device locally or via a local area network (LAN), a wide area network (WAN) such as the Internet or the like in order that the general purpose computer, the special purpose computer, or the processor or the programmable circuitry of the other programmable data processing device performs the computer readable instruction to provide means for performing operations specified by the flowchart or the block diagram. An example of the processor includes a computer processor, processing unit, microprocessor, digital signal processor, controller, microcontroller, or the like.

While the present invention has been described by way of the embodiments, the technical scope of the present invention is not limited to the above described embodiments. It is apparent to persons skilled in the art that various alterations or improvements can be added to the above-described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: system; 20: network; 40: gateway; 50: gateway; 100: service flight vehicle; 101: service flight vehicle; 102: service flight vehicle; 103: service flight vehicle; 104: service flight vehicle; 105: service flight vehicle; 106: service flight vehicle; 107: service flight vehicle; 108: service flight vehicle; 109: service flight vehicle; 110: service flight vehicle; 111: service flight vehicle; 112: service flight vehicle; 121: main wing; 122: main body; 124: propeller; 130: solar cell panel; 132: antenna; 134: antenna; 136: antenna; 142: wireless communication area; 150: communication device; 200: relay flight vehicle; 201: relay flight vehicle; 202: relay flight vehicle; 203: relay flight vehicle; 204: relay flight vehicle; 221: main wing; 222: main body; 224: propeller; 230: solar cell panel; 234: antenna; 236: antenna; 250: relay device; 300: control device; 302: storage unit; 304: flight vehicle position information acquisition unit; 306: arrangement determination unit; 308: flight vehicle control unit; 310: priority setting unit; 312: weather-related information reception unit; 314: communication speed-related information acquisition unit; 400: user terminal; 450: user; 500: weather-related information management server; 600: MEC server; 1200: computer; 1210: host controller; 1212: CPU; 1214: RAM; 1216: graphics controller; 1218: display device; 1220: input/output controller; 1222: communication interface; 1224: storage device; 1226: DVD drive; 1227: DVD-ROM; 1230: ROM; 1240: input/output chip; and 1242: keyboard.

What is claimed is:

1. A control device comprising:
a flight vehicle position information acquisition unit which acquires service flight vehicle position information indicating positions of a plurality of service flight vehicles, each of which functions as a stratosphere platform and is mounted with a communication device which forms a wireless communication area by emitting a beam and provides a wireless communication service to a user terminal in the wireless communication area;
an arrangement determination unit which determines arrangement of a relay flight vehicle which relays communication of one service flight vehicle among the plurality of service flight vehicles on a basis of a predetermined condition and the service flight vehicle position information;
a flight vehicle control unit which controls the relay flight vehicle to move according to the arrangement determined by the arrangement determination unit and establish wireless communication connection with the one service flight vehicle; and
a weather-related information reception unit which receives weather-related information on weather in the wireless communication area formed by each of the plurality of service flight vehicles, the weather-related information including rainfall information indicating a rainfall in the wireless communication area formed by each of the plurality of service flight vehicles.

2. The control device according to claim 1, wherein
the arrangement determination unit determines the arrangement of the relay flight vehicle such that wireless communication connection is able to be established with both the one service flight vehicle and a gateway on ground, and
the flight vehicle control unit further controls the relay flight vehicle to relay communication between the one service flight vehicle and the gateway.

3. The control device according to claim 2, wherein the arrangement determination unit determines the arrangement of the relay flight vehicle such that a distance between the relay flight vehicle and the gateway becomes shorter within a range where wireless communication connection is able to be established with both the one service flight vehicle and the gateway.

4. The control device according to claim 1, wherein
the arrangement determination unit determines the arrangement of the relay flight vehicle such that wireless communication connection is able to be established with both the one service flight vehicle and another service flight vehicle among the plurality of service flight vehicles, and
the flight vehicle control unit further controls the relay flight vehicle to establish wireless communication connection with the another service flight vehicle and relay communication between the one service flight vehicle and the another service flight vehicle.

5. The control device according to claim 2, wherein
the arrangement determination unit determines the arrangement of the relay flight vehicle such that wireless communication connection is able to be established with both the one service flight vehicle and another service flight vehicle among the plurality of service flight vehicles, and
the flight vehicle control unit further controls the relay flight vehicle to establish wireless communication connection with the another service flight vehicle and relay communication between the one service flight vehicle and the another service flight vehicle.

6. The control device according to claim 3, wherein
the arrangement determination unit determines the arrangement of the relay flight vehicle such that wireless communication connection is able to be established with both the one service flight vehicle and another service flight vehicle among the plurality of service flight vehicles, and
the flight vehicle control unit further controls the relay flight vehicle to establish wireless communication connection with the another service flight vehicle and relay communication between the one service flight vehicle and the another service flight vehicle.

7. The control device according to claim 1, wherein
the arrangement determination unit determines the arrangement of the relay flight vehicle such that wireless communication connection is able to be established with both the one service flight vehicle and another relay flight vehicle, and
the flight vehicle control unit further controls the relay flight vehicle to establish wireless communication connection with the another relay flight vehicle and relay communication between the one service flight vehicle and the another relay flight vehicle.

8. The control device according to claim 2, wherein
the arrangement determination unit determines the arrangement of the relay flight vehicle such that wireless communication connection is able to be established with both the one service flight vehicle and another relay flight vehicle, and
the flight vehicle control unit further controls the relay flight vehicle to establish wireless communication connection with the another relay flight vehicle and relay communication between the one service flight vehicle and the another relay flight vehicle.

9. The control device according to claim 3, wherein
the arrangement determination unit determines the arrangement of the relay flight vehicle such that wireless communication connection is able to be established with both the one service flight vehicle and another relay flight vehicle, and
the flight vehicle control unit further controls the relay flight vehicle to establish wireless communication connection with the another relay flight vehicle and relay communication between the one service flight vehicle and the another relay flight vehicle.

10. The control device according to claim 1, further comprising:
a priority setting unit which sets a priority of the wireless communication area of each of the plurality of service flight vehicles wirelessly communicatively connected to the relay flight vehicle, wherein
the flight vehicle control unit further controls the relay flight vehicle to allocate a predetermined communication capacity to the plurality of service flight vehicles on a basis of the priority set by the priority setting unit.

11. The control device according to claim 2, further comprising:
a priority setting unit which sets a priority of the wireless communication area of each of the plurality of service flight vehicles wirelessly communicatively connected to the relay flight vehicle, wherein
the flight vehicle control unit further controls the relay flight vehicle to allocate a predetermined communication capacity to the plurality of service flight vehicles on a basis of the priority set by the priority setting unit.

12. The control device according to claim 3, further comprising:
a priority setting unit which sets a priority of the wireless communication area of each of the plurality of service flight vehicles wirelessly communicatively connected to the relay flight vehicle, wherein
the flight vehicle control unit further controls the relay flight vehicle to allocate a predetermined communication capacity to the plurality of service flight vehicles on a basis of the priority set by the priority setting unit.

13. The control device according to claim 1, wherein
the arrangement determination unit determines arrangement of the relay flight vehicle which relays communication of the one service flight vehicle, of which the wireless communication area formed has the rainfall larger than a predetermined rainfall threshold, among the plurality of service flight vehicles on a basis of the rainfall information included in the weather-related information.

14. The control device according to claim 1, wherein the rainfall information is predicted rainfall information, and
the arrangement determination unit determines arrangement of the relay flight vehicle which relays communication of the one service flight vehicle, of which the wireless communication area formed has the predicted rainfall larger than a predetermined predicted rainfall threshold, among the plurality of service flight vehicles on a basis of the predicted rainfall information included in the weather-related information.

15. The control device according to claim 1, further comprising:
a communication speed-related information acquisition unit which acquires communication speed-related information on communication speeds of the plurality of service flight vehicles, wherein
the arrangement determination unit determines, on a basis of the communication speed-related information, arrangement of the relay flight vehicle which relays communication of the one service flight vehicle, which has a communication speed with the user terminal lower than a first communication speed threshold or a communication speed with a gateway on ground lower than a second communication speed threshold, among the plurality of service flight vehicles.

16. The control device according to claim 1, wherein the control device is mounted on the relay flight vehicle.

17. A non-transient computer-readable medium storing instructions that, when executed by a computer, causes the computer to function as:
a flight vehicle position information acquisition unit which acquires service flight vehicle position information indicating positions of a plurality of service flight vehicles, each of which functions as a stratosphere platform and is mounted with a communication device which forms a wireless communication area by emitting a beam and provides a wireless communication service to a user terminal in the wireless communication area;
an arrangement determination unit which determines arrangement of a relay flight vehicle which relays communication of one service flight vehicle among the plurality of service flight vehicles on a basis of a predetermined condition and the service flight vehicle position information;
a flight vehicle control unit which controls the relay flight vehicle to move according to the arrangement determined by the arrangement determination unit and establish wireless communication connection with the one service flight vehicle; and
a weather-related information reception unit which receives weather-related information on weather in the wireless communication area formed by each of the plurality of service flight vehicles, the weather-related information including rainfall information indicating a rainfall in the wireless communication area formed by each of the plurality of service flight vehicles.

18. A control method which is executed by a computer, the control method comprising:
acquiring flight vehicle position information by acquiring service flight vehicle position information indicating positions of a plurality of service flight vehicles, each of which functions as a stratosphere platform and is mounted with a communication device which forms a wireless communication area by emitting a beam and provides a wireless communication service to a user terminal in the wireless communication area;
determining arrangement of a relay flight vehicle which relays communication of one service flight vehicle among the plurality of service flight vehicles on a basis of a predetermined condition and the service flight vehicle position information;
controlling a flight vehicle by controlling the relay flight vehicle to move according to the arrangement determined by the determining arrangement and establish wireless communication connection with the one service flight vehicle; and
receiving weather-related information on weather in the wireless communication area formed by each of the plurality of service flight vehicles, the weather-related information including rainfall information indicating a rainfall in the wireless communication area formed by each of the plurality of service flight vehicles.

* * * * *